March 5, 1940.  P. JEPSON  2,192,444
APPARATUS FOR PITTING FRUIT
Filed Sept. 10, 1935   8 Sheets-Sheet 1
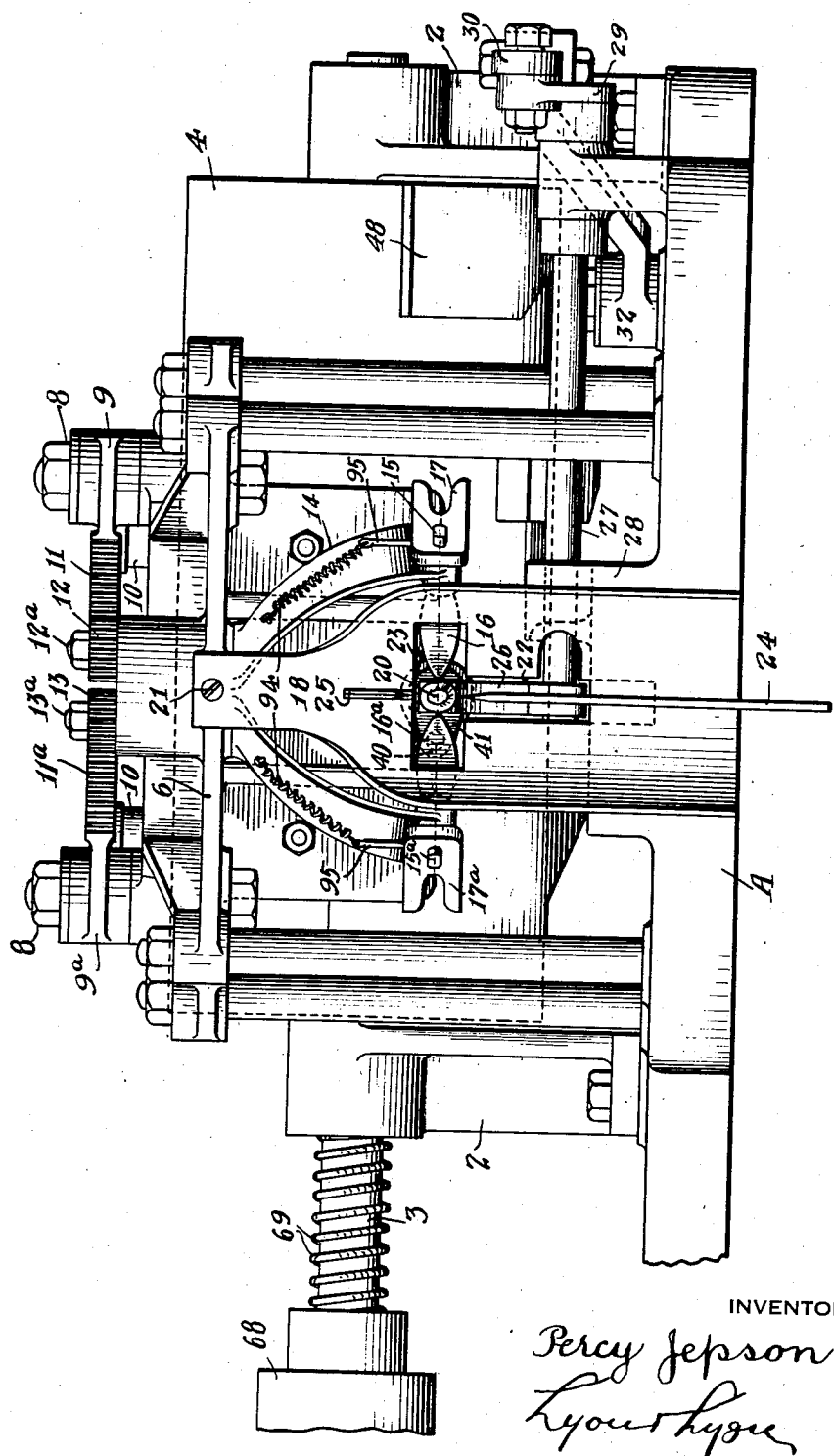
INVENTOR.
Percy Jepson
Lyon & Lyon
ATTORNEYS

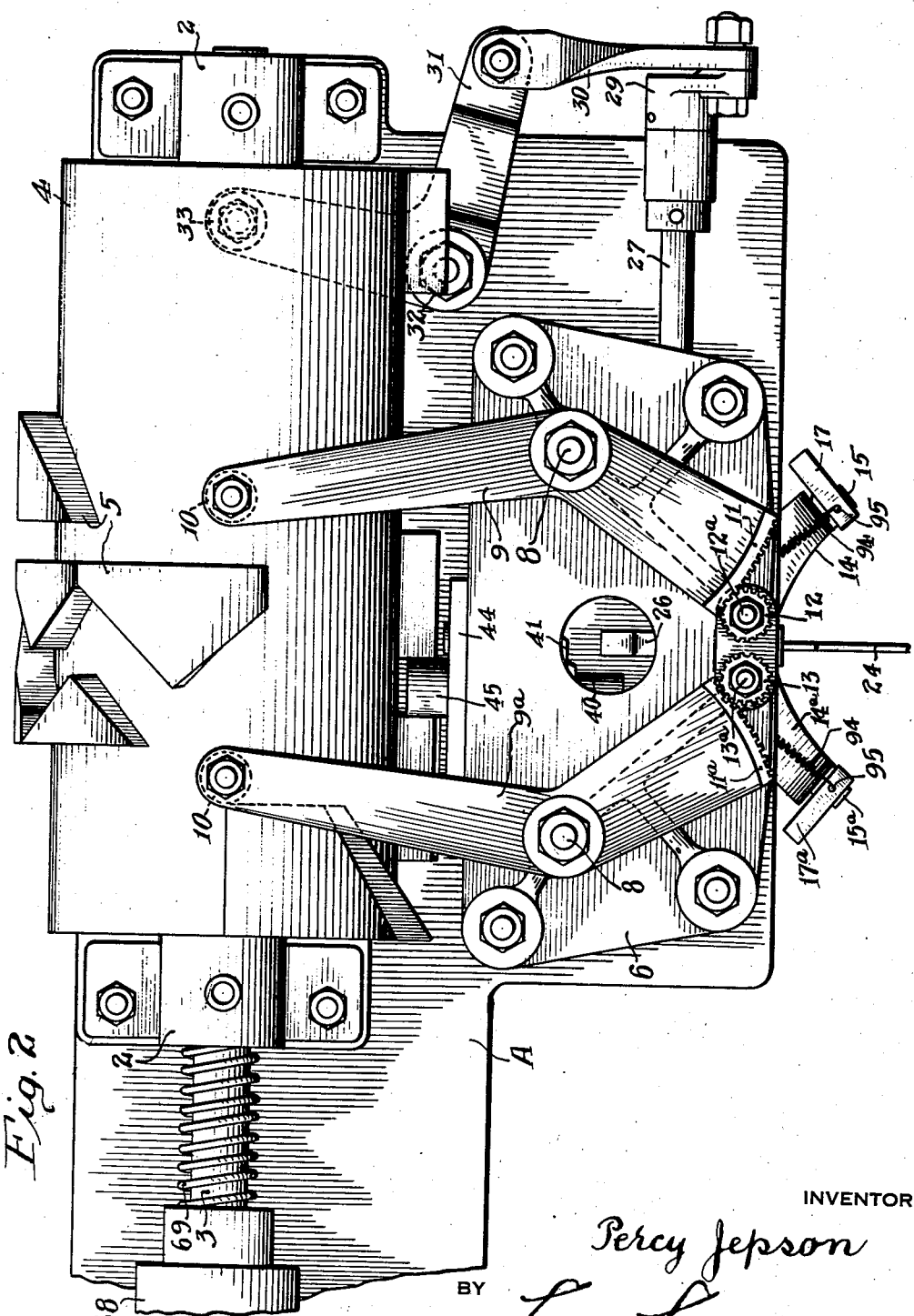

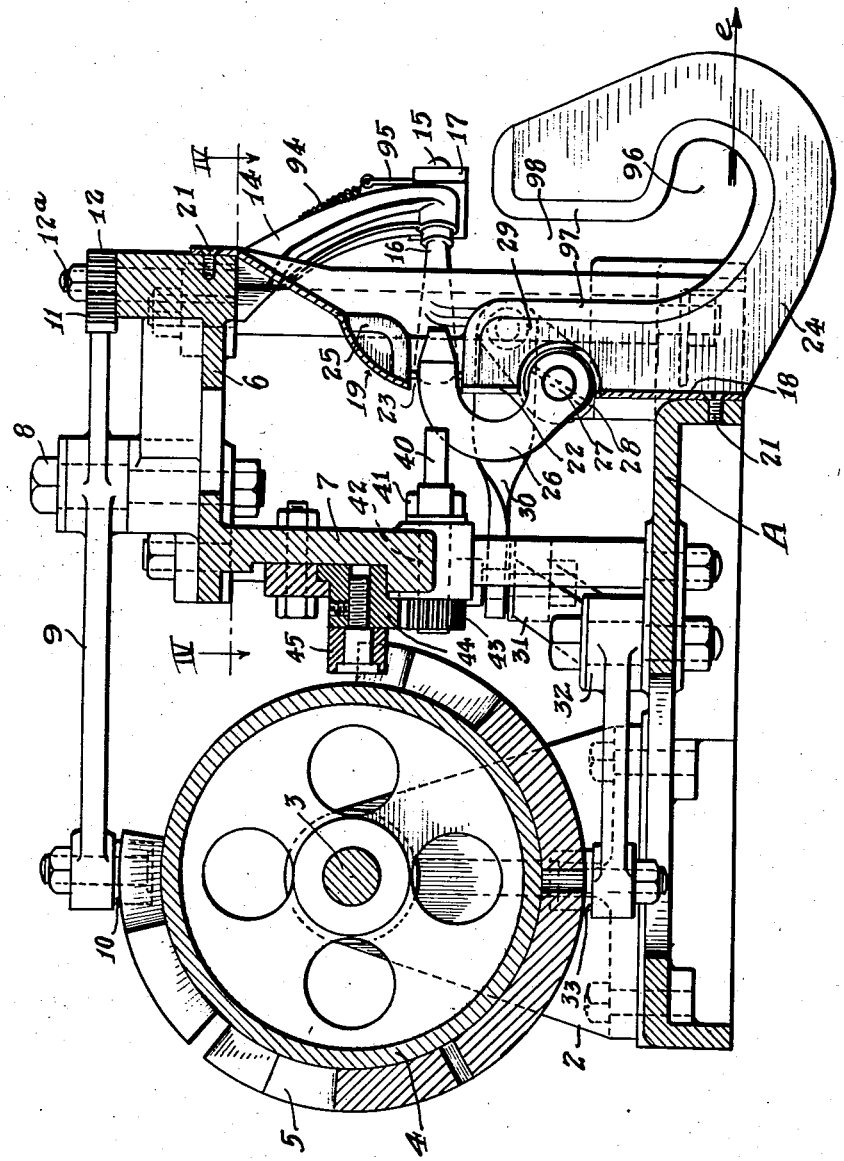

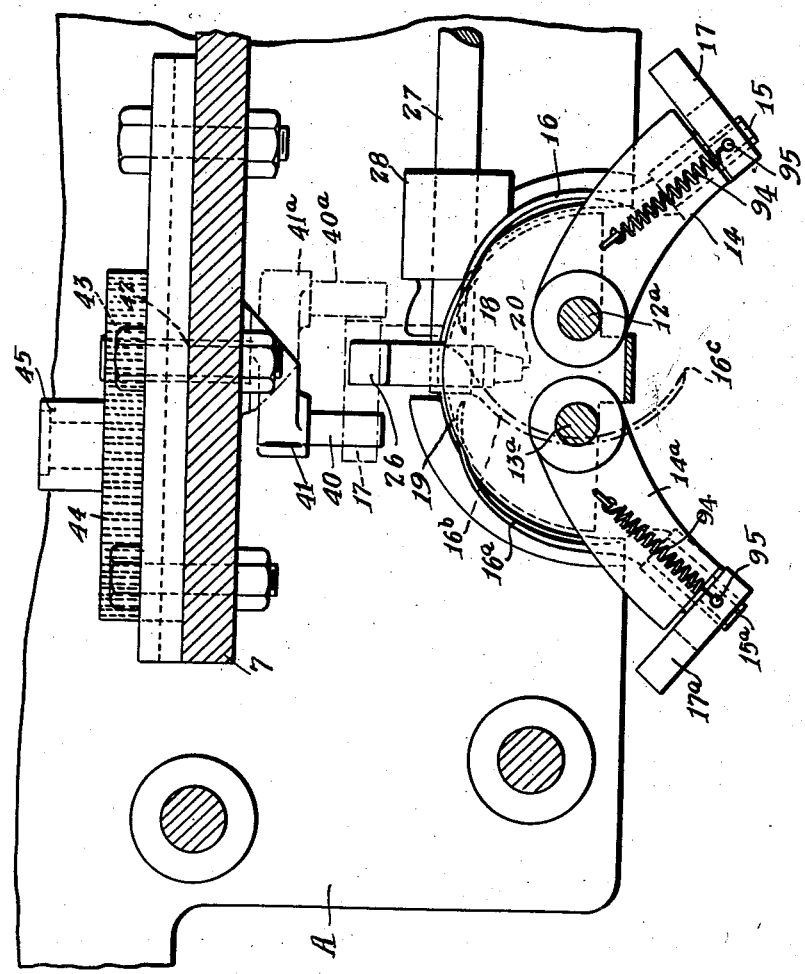

March 5, 1940. P. JEPSON 2,192,444
APPARATUS FOR PITTING FRUIT
Filed Sept. 10, 1935 8 Sheets-Sheet 5
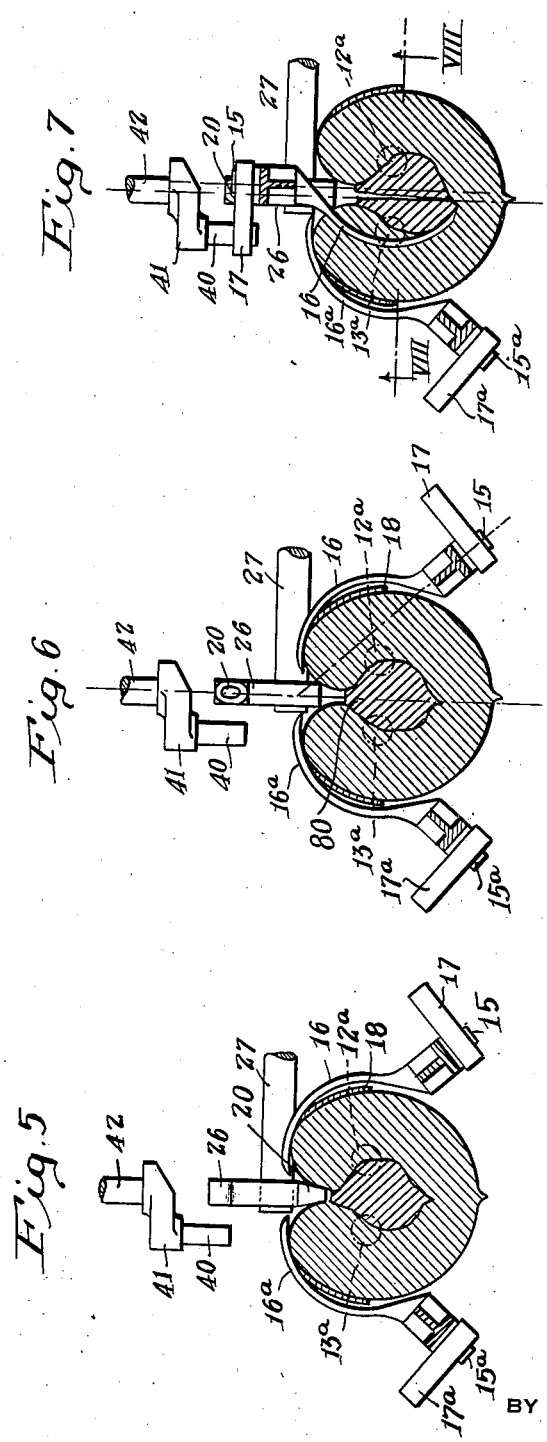
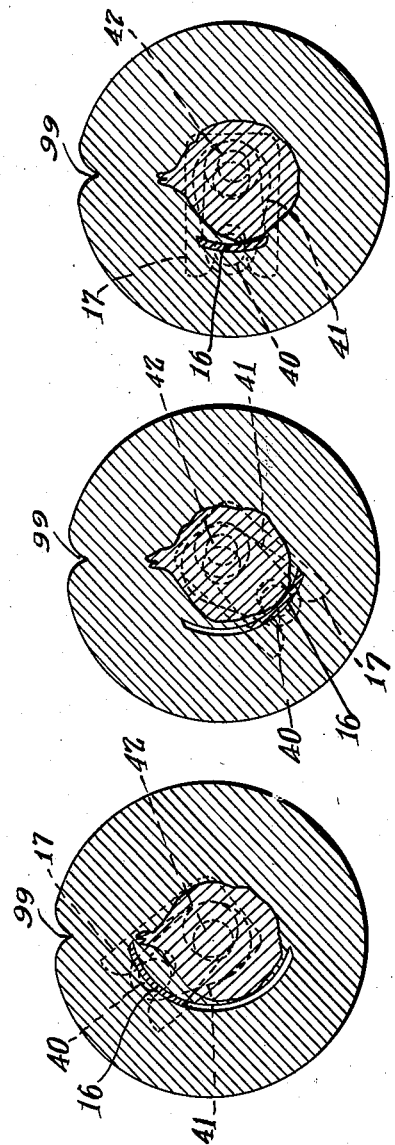
INVENTOR.
Percy Jepson
BY
ATTORNEYS March 5, 1940.   P. JEPSON   2,192,444
APPARATUS FOR PITTING FRUIT
Filed Sept. 10, 1935   8 Sheets-Sheet 6

INVENTOR.
Percy Jepson
BY
Lyon & Lyon
ATTORNEYS

March 5, 1940. P. JEPSON 2,192,444
APPARATUS FOR PITTING FRUIT
Filed Sept. 10, 1935 8 Sheets-Sheet 7
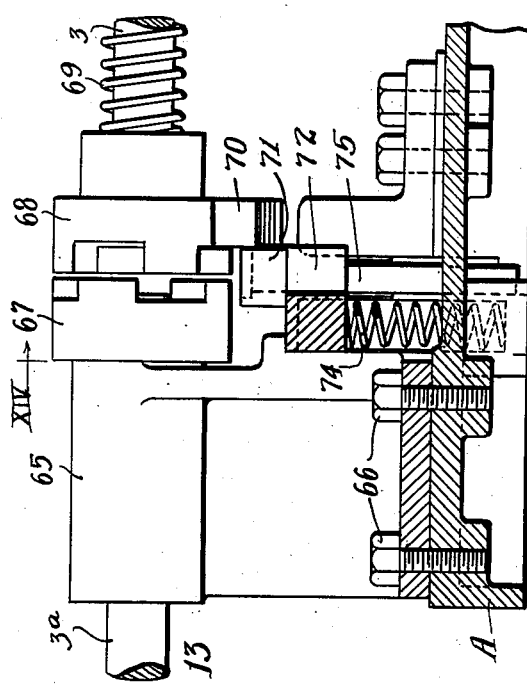
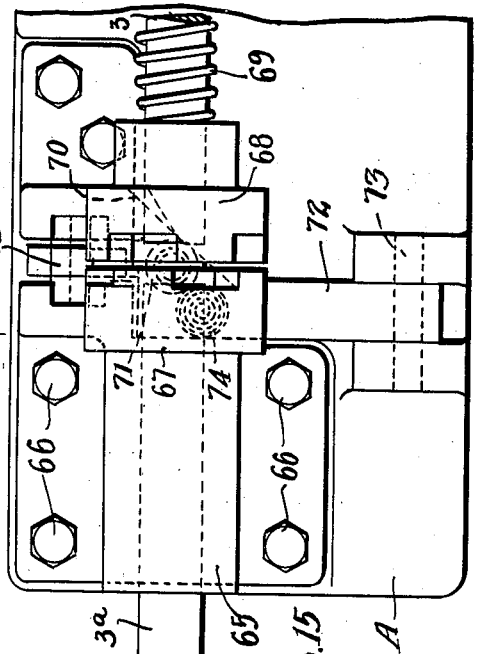
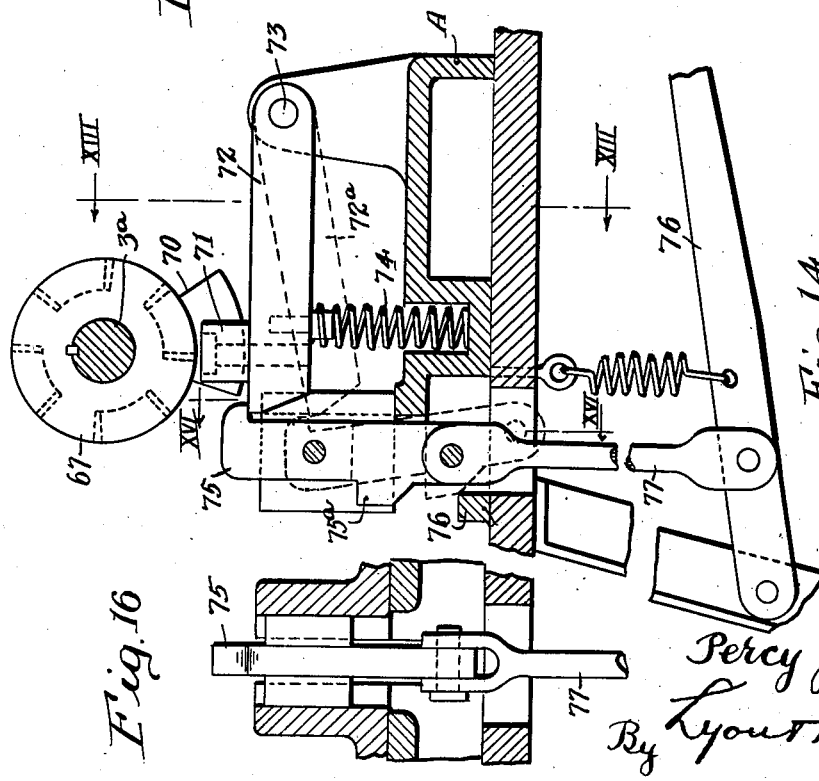
INVENTOR.
Percy Jepson
By Lyon+Lyon
ATTORNEYS March 5, 1940.   P. JEPSON   2,192,444
APPARATUS FOR PITTING FRUIT
Filed Sept. 10, 1935   8 Sheets-Sheet 8
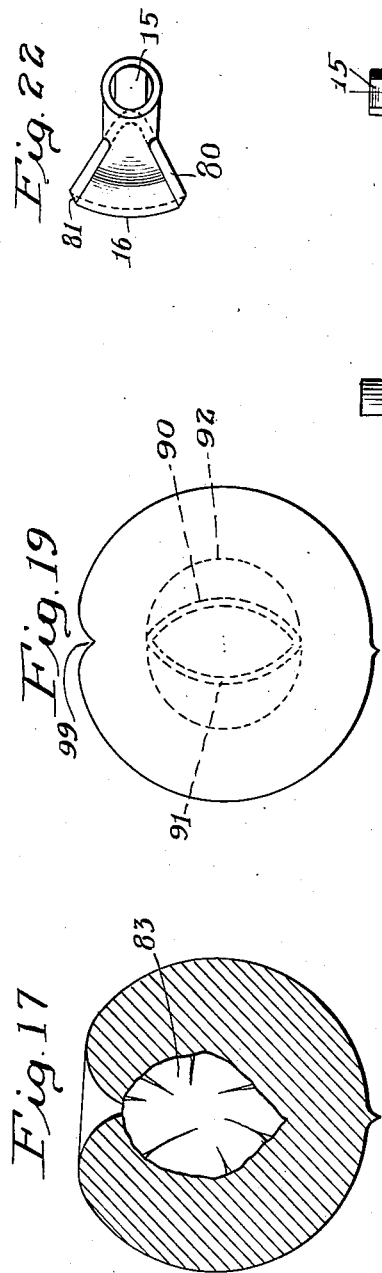
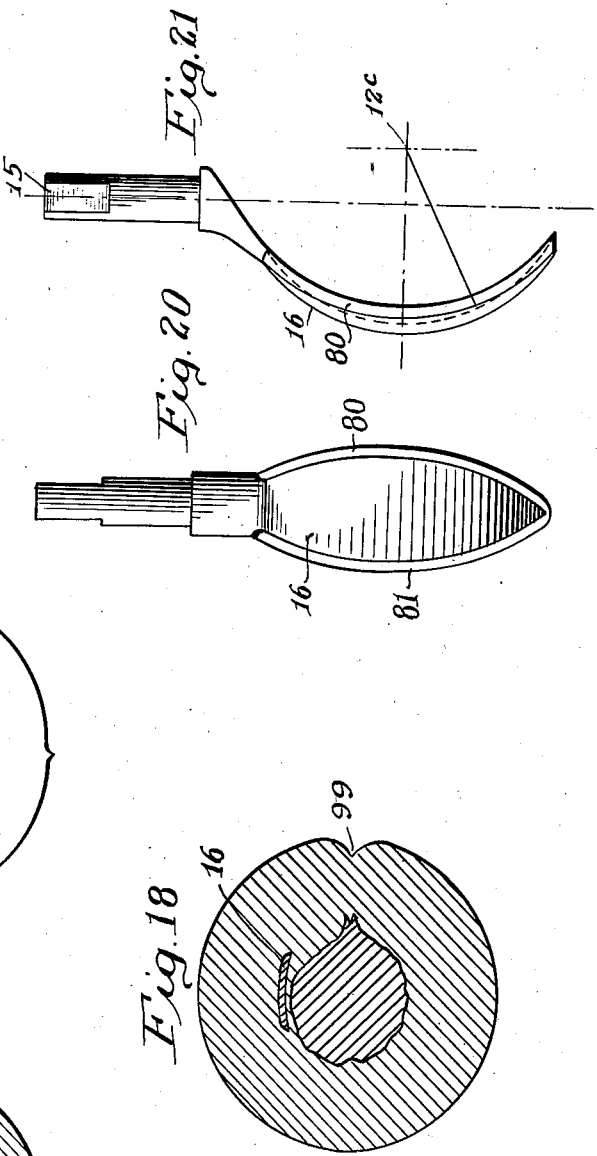
INVENTOR.
Percy Jepson
BY
ATTORNEYS Patented Mar. 5, 1940

2,192,444

UNITED STATES PATENT OFFICE 2,192,444

APPARATUS FOR PITTING FRUIT

Percy Jepson, San Francisco, Calif., assignor to Pacific Machinery Company, San Francisco, Calif., a corporation of California Application September 10, 1935, Serial No. 39,931

11 Claims. (Cl. 146—28)

This invention relates to apparatus for pitting fruit, such as clingstone peaches and the like.

The pitting of clingstone peaches on a commercial scale, for instance in fruit canneries or the like, is usually accomplished by hand operation. Numerous peach pitting machines have been designed for this purpose but with questionable success as ninety-five per cent or more of the cannery output is hand pitted. The reasons therefor are several: First of all, the size of the peaches and the pits contained vary with different varieties; secondly, some peaches will contain split pits which may be fairly widely separated and other peaches will not only contain split pits but one or both halves of the pit may be cracked and will accordingly present projecting portions not encountered in an average peach; thirdly, in removing the pit the amount of flesh removed with it should be as small as possible but sufficient flesh must nevertheless be cut away to remove all traces of the fibrous red center adjacent the surface of the pit.

Where hand pitting is resorted to the varying conditions encountered are, comparatively speaking, minor, but where machine pitting is attempted each condition becomes a problem not so readily solved, hence while one machine may remove an average pit it becomes a failure where split or cracked pits are encountered and so on.

The object of the present invention is to provide an apparatus for pitting peaches whereby practically all problems or conditions encountered are readily accomplished; to provide a method of pitting whereby the amount of flesh removed and adhering to the pit when cutting or freeing the pit with relation to the flesh may be reduced to a minimum; to provide an apparatus for pitting whereby the pitting knife will follow the exterior surface or contour of the pit as closely as possible; to provide an apparatus for pitting whereby the pit is cut free from the surrounding flesh prior to cutting the peach into halves so as to utilize the flesh of the fruit to encompass and hold the pit during the pitting operation; to provide an apparatus for pitting which includes two knives, one knife to sever or free one side of the pit with relation to the surrounding flesh and a second knife to sever the other side of the pit with relation to the surrounding flesh; to provide a pair of pitting knives operable in successive order and insertable in the peach through the flower or stem end; to provide means for centering and positively positioning the peach and particularly the pit of the peach with relation to the pitting knives; and further, to provide means for securing the peach against rotation during the pitting operation. Further objects will hereinafter appear.

The invention is shown by way of illustration in the accompanying drawings, in which Fig. 1 is a front view of the machine;

Fig. 2 is a plan view;

Fig. 3 is a central vertical cross section;

Fig. 4 is an enlarged plan section taken of line IV—IV of Fig. 3, said view showing the arms by which the pitting knives are supported and a part of the mechanism actuating the same;

Figs. 5, 6 and 7 are diagrammatic sectional views, showing the mechanism whereby the peach is centered with relation to the pitting knives, said views also showing a part of the mechanism whereby the pitting knives are inserted and oscillated;

Fig. 8 is an enlarged diagrammatic section taken on line VIII—VIII of Fig. 7, said view showing the first position assumed by one of the pitting knives after insertion;

Figs. 9 and 10 are similar sections showing the second and third positions assumed by one of the pitting knives when subjected to oscillating movement.

Fig. 13 is a side elevation partially in section of the clutch mechanism whereby the drive shaft is actuated, said section being taken on line XIII—XIII of Fig. 14;

Fig. 14 is a vertical cross section taken on line XIV—XIV of Fig. 13, said view showing the latch or releasing mechanism and a portion of the foot treadle;

Fig. 15 is a plan view of the clutch shown in Fig. 14;

Fig. 16 is a vertical section taken on line XVI—XVI of Fig. 14;

Fig. 17 is a sectional view of a peach showing a cracked pit;

Fig. 18 is a diagrammatic view of a peach and pit, said view showing the position of one of the pitting knives;

Fig. 19 is a plan view of a peach showing the manner in which the pit is cut or freed with relation to the flesh by means of two knives, said view also showing in dotted lines the circular cut formed by a single knife;

Fig. 20 is a front view of one of the pitting knives;

Fig. 21 is a side elevation of the same;

Fig. 22 is an end view of Fig. 21, looking from the top end of the pitting knife;

Figure 12:
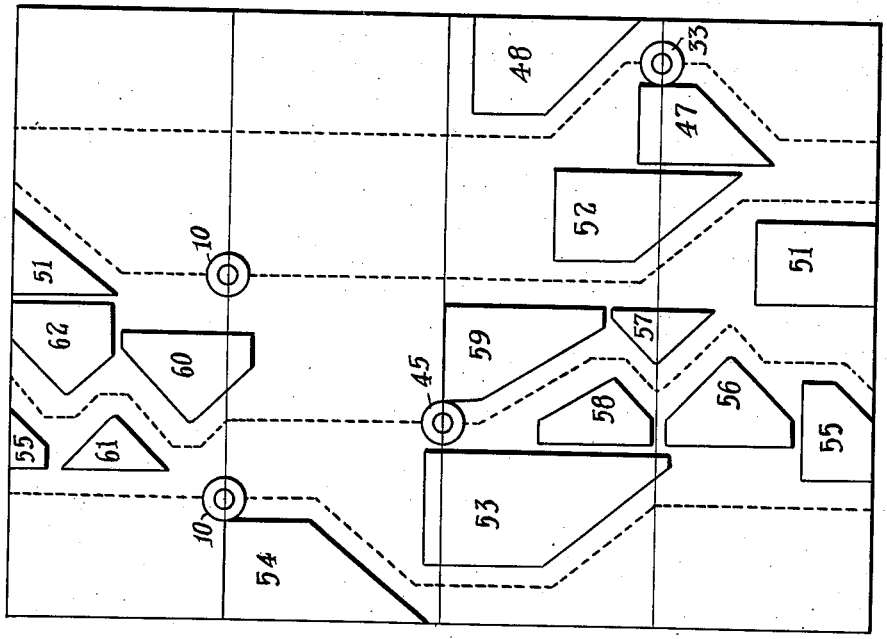
Fig. 12 is a development of the cam drum showing the location of the cam segments with relation to the rollers which they actuate.

Referring to the drawings in detail and particularly Figs. 1 to 4, A indicates a base member on which is secured a pair of bearing members 2. Journaled in said bearings is a shaft 3 and secured thereon is a drum 4 on the exterior surface of which is formed or secured a plurality of cam members generally indicated at 5. Disposed in front of the cam drum and in an elevated position with relation to the base plate is an angle shaped frame comprising an upper horizontal plate 6 and a rear downwardly extending plate 7. Pivotally mounted on the plate 6 of the frame as at 8—8 are a pair of arms 9 and 9a. One end of each arm is provided with a roller 10 which is adapted to be engaged by the cams on the cam drum. The opposite ends of the arms terminate in gear segments 11, the segment on the arm 9 intermeshing with a gear pinion 12 and the segment on the arm 9a with a gear pinion 13. Vertically disposed and journaled in the plate 6 of the frame are a pair of shafts 12a and 13a and on their upper ends are secured the pinion gears 12 and 13.

Secured on the lower ends of these shafts are arms 14 and 14a and journaled in the lower ends of these arms in a position at right angles to the shafts 12a and 13a are shafts 15 and 15a. Shaft 15 carries a pitting knife 16 at one end and a fork-shaped crank arm 17 at its other end, while shaft 15a carries a pitting knife 16a at one end and a fork-shaped crank arm 17a at its opposite end.

Before describing the shape or construction of the pitting knives and the manner in which they are operated, it is important to note that two identical pitting knives are employed which are independently and successively actuated and, furthermore, that they are inserted through or adjacent the flower or stem end of the peach and that they are rotated slightly less than one-half of a revolution so as to produce arcuate cuts on opposite sides of the pit, one knife performing one cut and the second knife the other cut. Inasmuch as the position of the pitting knives and their arc of rotation is fixed, it is necessary to center and correctly position the peaches to be pitted prior to the pitting operation. This is accomplished first by providing a shield 18 having a cup-shaped portion 19 formed therein for the reception of the stem end of the peach, and secondly, by providing a centering pin 20 to properly center and position the stem of the peach in the cup. The shield proper may be constructed of sheet metal or the like and is secured at its upper end to the front of the frame member 6 by means of screws 21 and it is similarly secured at its lower edge to the base A.

The shield is best illustrated in Figs. 1 and 3. The cup-shaped portion is slotted longitudinally as indicated at 22 and it is also slotted crosswise as indicated at 23 to permit the pitting knives to freely pass through during the period when they enter the peach and are retracted from the same. The shield also carries a splitting or halving knife generally indicated at 24, the function of which will hereinafter be described, and in addition to the halving knife it carries a supplementary knife 25 by which the stem end of the peach is partially cut when placed in position.

The centering pin 20 is formed at the end of a crank arm 26. This arm is secured on shaft 27 journaled in a bearing bracket 28. The opposite end of the shaft carries a crank arm 29 and this is connected through means on a link 30 with one arm of a bell crank 31. The bell crank is pivotally supported on the base plate as indicated at 32 and the opposite end of the bell crank is provided with a roller 33 which is adapted to be engaged by the cams 5, as will hereinafter be described. The centering pin 20 is swung into the raised position shown in Fig. 3 prior to placing a peach in position and, as previously stated, serves the function of centering and positively positioning the peach and particularly the pit contained in the peach with relation to the pitting knives. The raised or centering position assumed is only momentary as the moment the peach has been positioned and centered, the crank arm 26 carrying the pin 20 is withdrawn and remains in a withdrawn position until just before the cycle is completed when it returns to its centering position.

The pitting knives 16 and 16a, as previously stated, operate independently of each other and in successive order, but inasmuch as their construction and operation is identical, the description of one will suffice. Each knife has two movements, for instance by referring to Fig. 4, the knife 16 normally assumes the inoperative position shown in full lines and the first movement imparted to it when a pitting operation takes place is that of swinging the knife, together with the arm 14, from the full line position shown to the dotted line position indicated at 16b. During this movement the point 16c of the pitting blade enters the peach through the flower or stem end and as it swings about the shaft 12 it obviously swings in an arcuate or true circle and finally assumes the dotted line position shown. After this position is reached, an oscillating movement is transmitted to the blade and during the oscillating movement one-half of the peach pit is freed with relation to the surrounding flesh.

The mechanism for transmitting the oscillating movement to the pitting knife 16 comprises a crank pin 40 secured on a crank arm 41. This arm is, in turn, secured to a shaft 42 which is journaled in a bearing formed in the lower edge of the frame section 7. Shaft 42, besides carrying the crank arm 40 and the crank pin 41, also carries a spur gear pinion 43 and this meshes with a rack bar 44 which is reciprocally mounted on the rear face of the frame member 7. The rack bar carries a roller 45 and this is engaged by the cams 5 and they are so arranged that reciprocal movement is transmitted to the rack bar. This reciprocal movement is in turn transmitted to the spur gear pinion 43, and the crank arm and pin 41 will accordingly oscillate. When the arm 14 carrying the pitting knife 16 is swung to assume the dotted line position shown at 16b in Fig. 4, the forked crank arm 17 carried by shaft 15 will straddle the crank pin 40, hence when an oscillating movement is transmitted to the crank arm 41 through the spur gear and the rack bar, shaft 15 will oscillate and so will the pitting knife 16 carried thereby. The exact manner in which the oscillating movement is transmitted will be later described.

From the description so far submitted, it will be noted that there are only two mechanisms to be actuated. First, the centering pin 20 and secondly the pitting knives 16 and 16a and it also should be noted that these members are primarily actuated by the cams 5 and that the cams in turn actuate the mechanism whereby the centering pin and the pitting knives are finally operated.

Figure 11:
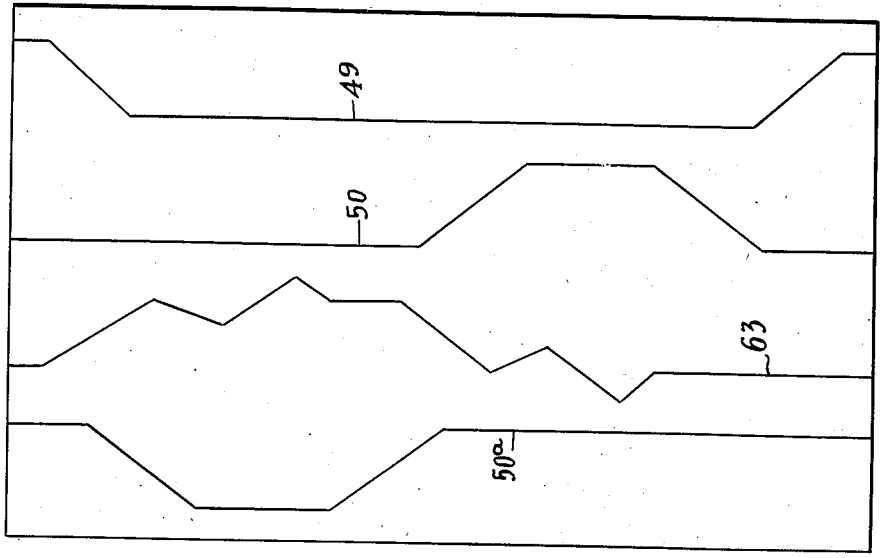
Fig. 11 is a diagrammatic view showing the cycle of cam movements.

In actual operation, reference should first be made to Figs. 11 and 12. By referring to these figures, it will be noted that there are four lines or rows of cams. The position of the cams is shown in Fig. 12 and the movement imparted by them is graphically illustrated in Fig. 11. The cams or cam which actuate the centering pin are shown at 47 and 48 and the movement imparted to the bell crank 31 actuated thereby is graphically shown by the line 49 in Fig. 11. The cams which actuate the insertion of the pitting knives are arranged in two rows graphically indicated at 50 and 50a in Fig. 11, the cams themselves being shown at 51, 52, 53 and 54. The cams which actuate the oscillating movement of the pitting knives are shown at 55, 56, 57, 58, 59, 60, 61 and 62 and the movement imparted by the cams is graphically illustrated by the line 63 in Fig. 11. The cams 47 and 48 actuate the arm 9 and the roller 10 carried thereby, while the cams 53 and 54 actuate the arm 9a and the roller 10 carried thereby. The cams indicated by the numerals 55 to 62, inclusive, actuate the roller 45 carried by the bar rack 44 to reciprocate the same and this in turn rotates the spur gear pinion 43 and the crank arm 41.

All movement transmitted by the cams or, in other words, the pitting of a peach is completed during one revolution of the cam drum and at the end of the revolution the drum comes to a rest. The next peach to be pitted is placed in position and centered during the rest period and another revolution is then imparted to the cam drum. The rotational movement of the cam drum is accordingly intermittent and a clutch mechanism such as shown in Figs. 13 to 16 is employed to start and stop the drum. In these drawings, 3a indicates a drive shaft driven from any suitable source of power. This shaft is journaled in a bearing member 65 secured as indicated at 66 to the base plate A. A jaw clutch 67 is secured on the end of the shaft and this cooperates with a jaw clutch 68 splined to the shaft 3. A spring 69 interposed between the bearing 2 and the clutch member 68 normally maintains the clutch members 67 and 68 in engagement and this engagement is maintained during the one revolution of the cam drum but the driving connection between the clutches is automatically broken at the end of each revolution by means of a cam 70 which engages a roller 71. This roller is mounted on the outer end of an arm 72 pivotally supported on the base plate as at 73. This arm is normally held in a raised position such as shown in Fig. 14 by means of a spring 74 but it may be manually depressed to assume the dotted line position shown at 72a by means of a latch 75 connected to a foot treadle 76 through means of a link 77. At the end of each revolution, cam 70 engages the roller 71 and thus automatically disconnects the clutches, hence permitting the drum to come to a stop. When it is desired to start the drum for another revolution, it is only necessary to trip the roller mechanism with the foot treadle 76. During depression of this pedal a downward pull is exerted on the latch 75 through means of the link 77. The arm 72, together with the roller 71, is accordingly pulled downwardly to the dotted line position indicated at 72a and the moment the roller clears the cam 70, spring 69 throws the clutches into engagement and the drum will start to rotate. When the foot treadle reaches its lowermost position a cam 75a on the latch engages a shoulder 76 and the latch is thus disengaged with relation to the arm 72 and this is thus automatically projected to raised position by means of spring 74.

Cam 70 has, however, moved out of alignment with the roller during this period and engagement is not made between the cam and the roller until the drum has completed its revolution. Plainly speaking, the driving connection between the drum and the driving shaft is automatically disconnected at the end of each revolution so as to permit the drum to come to a rest. During the rest period the next peach to be pitted is placed in position and centered and rotation of the drum is again started by merely tripping with the foot treadle, hence the duration of the rest period will be entirely dependent upon the speed of the operator. It might be two or three seconds with one operator and four or five with a slower operator as the drum cannot start a new rotation until the clutch is tripped with the foot treadle.

The operation of the machine will be as follows: When the drum has reached its position of rest the centering pin 20 will assume the full line position shown in Fig. 3 as the roller 33 carried by the crank arm 31 is engaged by the cam 47 a moment prior to the time when the drum reaches rest position. Hence, during the rest period the centering pin is in raised or projected position within the cup-shaped portion of the shield and the operator may thus place the peach in position and properly center by means of the centering pin 20. When placing the peach in position in the cup, it must be considered that the peach pit is divided into two halves and that the halves are joined by a continuous seam or projecting fin.

All peaches have a crease or slit depression running from the stem end of the peach to the spike or lower end, such as indicated at 99 in Figs. 8, 9 and 10. This crease or depression is parallel to the seam or fin side of the pit and when the operator places the peach in the cup, the crease 99 is turned upwardly so that the fin or seam of the pit is disposed parallel to the knives 24 and 25. The next feature the operator must take care of in placing the peach in the cup is that of insuring registration between the stem end of the peach and the centering pin. Hence, when placing the peach in the cup, the depression at the stem end is aligned with the pin and the peach is pushed inwardly, thus causing the pin 20 to enter the depression and center the peach and particularly the pit contained therein, as the end of the pit comes directly to the surface of the depressions as clearly shown at 80 in Fig. 6. It was previously stated that the knives 24 and 25 were carried by the shield plate; hence if the peach is properly positioned, knives 24 and 25 will enter the stem end of the peach and partially cut the same. This is not an essential feature but it is nevertheless an advantage as it secures the peach against rotational movement during the pitting operation. In the present instant no means are disclosed for holding the peach except the hand of the operator; hence, if the operator merely presses inwardly on the peach after it is placed in position, that will be all that is necessary as the peach will be held against rotation by the knives 24 and 25 entering the end thereof.

When the peach has been placed in position and entered as described, the operator steps on the foot treadle 76 and in so doing permits the clutches 67 and 68 to engage. Power will accordingly be transmitted to rotate the cam drum 4 and it will continue to rotate until one revolution is completed when the clutch is automatically actuated to disconnect the drive and thereby prevent further rotation. During this period of rotation the centering pin is first withdrawn. This is accomplished by the cam 48 (see Fig. 12) and the moment the centering pin is withdrawn the pitting knife 16 will be inserted. This is accomplished by engagement of cam 51 with the roller 10 carried by the arm 9. When cam 51 engages the roller, arm 9 is swung about its pivot 8 and the gear segment 11 formed on the opposite end thereof will accordingly swing and transmit a rotary movement to the gear pinion 12 and the shaft 12a to which it is secured.

The lower end of the shaft carries the arm 14 and this in turn carries the shaft 15, on one end of which is secured the pitting knife 16 and on the opposite end of which is secured the forked crank arm 17. The degree of rotation horizontally imparted is substantially 140°, that is, slightly more than three-eighths of a revolution, depending on the length of the blades, and during this horizontal rotational movement the pointed end 16 of the pitting blade enters the stem end of the peach. It follows a true arc of a circle and finally assumes the dotted line position, shown at 16b in Fig. 4, or, in other words, the full line position, shown in Fig. 7 and in cross section in Fig. 8. When the pitting blade or knife has been fully inserted, an oscillating movement is transmitted thereto through means of the cam 60. It should be remembered that the forked crank arm 17 will at this time straddle the pin 40 of the crank arm 41. Hence, when cam 60 engages the roller 45, which is carried by the rack bar, reciprocal movement will be transmitted to the rack bar in one direction and this will be transmitted through the pinion 43 to swing the crank arm and pin 41. This in turn transmits a movement through the forked crank arm 17, and the pitting knife is swung or oscillated slightly less than a quarter revolution, depending on the width of the blade, it being swung from the position shown in Fig. 8 to the position shown in Fig. 9. When this movement has been completed, roller 45 is engaged by the cam 61 and the pitting blade or knife is swung from the position shown in Fig. 9 to the position shown in Fig. 10, or, in other words, a distance slightly less than one-half revolution, depending on the width of the blade, and when this movement has been completed, cam 62 is engaged and the blade or knife is swung back to the position shown in Fig. 8. During this period, that is, while engagement is made with cam 62, cam 52 engages the roller 10 on the arm 9, the pivotal movement of the arm being thereby reversed and the pitting blade withdrawn, hence returning to the full line position, shown at 16 in Fig. 4 and also in Fig. 6. At this period in the cycle of operation, one-half of the pit has been cut free with relation to the surrounding flesh. The roller 45 is next engaged by the cam 55, and the crank arm 41 is rotated a half revolution so as to assume the dotted line position, indicated at 41a and 40a in Fig. 4. This is essential, as the second pitting knife indicated at 16a will next be inserted, that is, the roller 10 carried by the arm 9a is at this time engaged by the cam 53 and the arm 9a is accordingly swung about its pivot, thus transmitting movement through the gear segment 11a to rotate the gear pinion 13 and the shaft 13a. This in turn carries the arm 14a, the shaft 15a, and the pitting blade 16a, together with the forked crank arm 17a, and this is swung from the full line position shown in Fig. 4 to a similar position as that indicated by the dotted lines 16b, but in a position on the opposite side of the pit. The moment insertion of the second blade or knife has been completed, roller 45 is engaged by cam 56, next cam 57, and finally cam 58. During this period an oscillating movement is transmitted to the blade or knife 16a in a manner similar to that shown in Figs. 8, 9 and 10, and the opposite side of the pit is thus cut or freed with relation to the surrounding flesh. Cam 54 will at this time engage the roller on arm 9a and the pitting knife will be withdrawn, and finally cam 59 engages roller 45, thus returning the crank arm 41 to the full line position shown in Fig. 4, where it is in readiness or position to actuate the fork-shaped crank arm 17 when this is moved into position for the next pitting operation. The drum has substantially completed its full revolution at this time and will accordingly come to rest as the clutch will be automatically disconnected, but just prior to coming to rest cam 47 engages roller 33 and the centering pin is accordingly swung to raised position so as to be in readiness during the rest period to receive and center the next peach to be pitted.

The pitting of the peach has been completed at the end of the cycle and it is now only necessary for the operator to split or halve the peach so as to permit removal of the pit which has been cut free from the surrounding flesh. This is accomplished by putting the peach downwardly through the slot 98 formed in the halving or cutting blade 24. The opposite cutting edges 97 formed on the knife 24 will, when the peach is pulled downwardly, partially split the peach, and when the peach reaches the lower end of the slot, indicated at 96, the peach is slightly rotated and pulled outwardly in the direction of the arrow e. By partially rotating the peach and pulling it outwardly in the manner described, the peach is completely halved, one-half remaining in one hand of the operator and the other half in the other hand, to be disposed of as desired. The halving of the peach to remove the free pit takes place during the rest period and the placing and centering of the next peach to be pitted also takes place during the rest period, and when the next peach has been centered on the centering pin, a new cycle of operation is started by tripping the clutch by means of the foot pedal, as previously described.

Upon referring to Figs. 1, 3 and 4, it will be noted that the crank arms 17 and 17a are provided with upwardly projecting rods or pins 95 and that springs 94 connect these pins with the arms 14 and 14a. These springs serve the function of maintaining the pitting blades in the full line position shown at 16 and 16a in Fig. 4, that is, in their inoperative or withdrawn position. It should be remembered that when the knives assume the inoperative or withdrawn position, neither of the cranks 17 or 17a are engaged by the pin 40. Hence, it is essential that some means be provided for maintaining the knives 16 and 16a in a predetermined position when inoperative and also to retain them in this position until the forked ends of the cranks 17 and 17a straddle the crank pin 40. Other means than the springs 94 shown could be employed, but as these springs accomplish the object sought in a simple manner, they are sufficient for the purpose described.

The specific construction of the pitting knife is an important feature of the present invention, and, as it is best illustrated in Figs. 20 to 22, reference will be made to these drawings. By referring to Fig. 20, which is a front view of one of the knives, it will be noted that the shape of the knife is arcuate both longitudinally and in cross section. This is important as it permits the construction of a knife which presents true arcuate surfaces, both longitudinally and transversely, the longitudinal arcuate surface shown in Fig. 1 being struck from the center of shaft 12 and the transverse arcuate surface shown in Fig. 22 being struck from the center of shaft 15. A self-cleaning blade is formed as it enters the peach longitudinally on a true arc and after entrance swings transversely on another arc. Cutting edges, such as shown at 80 and 81, may be formed on opposite sides permitting the blade to cut both longitudinally and transversely. The cutting edges are formed on substantially 60° angles, as shown in Fig. 22, and as such form deflecting surfaces which cause the blade or knife to closely cling or adhere to the surface of the pit particularly during the transverse cutting operation heretofore referred to as the oscillating movement of the knife. Again, by referring to Fig. 18, it will be noted that the transverse curve struck from the center of shaft 15 presents a curve which is flatter than the average contour of the pit, hence permitting the belly of the knife to contact or ride on the surface of the pit without the cutting edges coming in contact therewith. This transverse curve of the cutting blade with relation to the pit is of further importance as pits are sometimes encountered which are cracked, as shown at 83 in Fig. 17. When the pit is cracked in this manner, projecting fragments of the cracked portions are often encountered but due to the transverse curvature of the blade with relation to the surface of the pit, the cutting edges have a tendency to clear or ride over the same. It also happens that a considerable number of pits are encountered which are split, as shown in Fig 7. The split usually starts at the stem end of the peach and the gap formed may be as much as three-eighths of an inch, but due to the fact that the blade, when entered longitudinally as shown in Fig. 7, enters on a true arc struck from the center of shaft 15, any chance of the point of the blade engaging the split upper end of the pit is avoided. It should also be noted that the shafts 12a and 13a are located at points opposite or on each side of a center line drawn through the peach, as indicated by dotted lines at 12a and 13a in Figs. 5, 6 and 7. This is also important as both the longitudinal and transverse cut formed by the pitting knife will form a cut less than 180°; hence in place of a semi-circular cut a flat shallow cut is produced which conforms substantially to the natural shape of the pit, in this manner reducing the amount of flesh removed to a minimum.

By referring to Figs. 8, 9 and 10, it will be noted that shaft 15, about which the knife swings when making the oscillating movement or transverse cut, is also at a point to one side of the center of the peach. Hence, the transverse cut is also less than 180° and as such tends to follow or conform to the natural outline or surface of the pit. The cuts formed by each individual pitting knife are clearly shown by dotted lines at 90 and 91 in Fig. 19. If a single knife was employed and a complete revolution was made, as is the case in many pitting machines, a true circular cut would be made and the circle ascribed by the cut would be that indicated at 92. By comparing the circular cut with the two blade cuts, indicated at 90 and 91, it is possible to appreciate the waste which is eliminated; hence, the importance of introducing the knife longitudinally from a center point, which is to one side of the center of the peach, as indicated at 12a in Fig. 7, and, furthermore, of making a transverse or oscillating cut from the point 15, which is also to one side of the center point of the peach should be appreciated, as it first of all permits the construction and use of a blade which has true arcuate surfaces both for longitudinal and transverse movement, and which forms a cut which substantially follows the contour of the pit both longitudinally and transversely.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

I claim:

1. In a fruit pitting machine, a support for the reception of fruit to be pitted, a pair of arms pivotally supported with relation to the support, an arcuate pitting knife pivotally supported in each arm, means cooperating with the support whereby the stem end of the fruit and the pit contained therein is placed in a fixed predetermined position with relation to the support and the knives, and means for successively inserting the arcuate knives through the stem end of the fruit and for oscillating the knives after insertion to free the pit with relation to the surrounding flesh.

2. In a fruit pitting machine, a support for the reception of a whole fruit to be pitted, an arcuate pitting knife disposed adjacent said support, means cooperating with the support whereby the stem end of the fruit together with the pit contained therein is placed in a fixed predetermined position with relation to the knife, a pivotal support for the knife positioned at one side of a center line drawn through the longitudinal axis of the fruit, said knife when swung about said pivotal support being inserted longitudinally through the stem end of the fruit on one side of the pit, a second pivotal support for the knife also disposed on the same side of the center line and about which the knife is oscillated to cut the flesh and free one side of the pit with relation to the surrounding flesh.

3. In a fruit pitting machine, a support for the reception of fruit to be pitted, an arcuate pitting knife disposed adjacent said support, means cooperating with the support whereby the stem end of the fruit together with the pit contained therein is placed in a fixed predetermined position with relation to the knife, a pivotal support for the knife positioned at one side of a center line drawn through the longitudinal axis of the fruit, said knife when swung about said pivotal support being inserted longitudinally through the stem end of the fruit on one side of the pit, a second pivotal support for the knife also disposed on the same side of the center line and about which the knife is oscillated to cut the flesh and free one side of the pit with relation to the surrounding flesh, a second knife similarly disposed and supported with relation to the support and the fruit placed therein on the other side of the center line, independent actuating means for inserting the knives in successive order, and a common means for imparting an oscillating movement to each knife after insertion.

4. In a fruit pitting machine, a support for the reception of fruit to be pitted, a pair of shafts journaled adjacent the support, a pair of arms secured one to each shaft, an arcuate pitting knife carried by each arm, means cooperating with the support whereby the stem end of the fruit together with the pit contained therein is placed in a fixed predetermined position with relation to the pitting knives, said shafts being positioned on opposite sides of a center line drawn through the longitudinal axis of the fruit to be pitted, a gear on each shaft, an arm pivotally disposed adjacent each gear, a gear segment on each arm and intermeshing with the adjacent gears, a rotary cam drum, cams on the drum successively engageable with the pivoted arms to impart a rocking movement thereto so as to successively rock the arms and thereby rotate the gears and the shafts carrying the knives, whereby the knives are inserted longitudinally through the stem end of the fruit on opposite sides of the pit, a pivotal support in each arm for each knife, said pivotal supports being also disposed on opposite sides of the center line when the knives are inserted in the fruit, and a common means for imparting an oscillating movement to each knife after insertion so as to free the pit with relation to the surrounding flesh.

5. In a fruit pitting machine, a support for the reception of fruit to be pitted, a pair of shafts journaled adjacent the support, a pair of arms secured one to each shaft, an arcuate pitting knife carried by each arm, means cooperating with the support whereby the stem end of the fruit together with the pit contained therein is placed in a fixed predetermined position with relation to the pitting knives, said shafts being positioned on opposite sides of a center line drawn through the longitudinal axis of the fruit to be pitted, a gear on each shaft, an arm pivotally disposed adjacent each gear, a gear segment on each arm and intermeshing with the adjacent gears, a rotary cam drum, cams on the drum successively engageable with the pivoted arms to impart a rocking movement thereto so as to successively rock the arms and thereby rotate the gears and the shafts carrying the knives, whereby the knives are inserted longitudinally through the stem end of the fruit on opposite sides of the pit, a pivotal support in each arm for each knife, said pivotal supports being also disposed on opposite sides of the center line when the knives are inserted in the fruit, and a common means for imparting an oscillating movement to each knife after insertion so as to free the pit with relation to the surrounding flesh, said common means comprising a fork-shaped crank arm connected with each pitting knife, a third crank arm adapted to be straddled by either of the first named crank arms, a gear whereby said third crank arm is adapted to be oscillated, a rack bar intermeshing with said gear, a roller on said rack bar, and cams on the drums engageable with the roller to transmit a reciprocal movement to the rack bar and an oscillating movement to the third crank arm and the crank arms actuated thereby.

6. In a fruit pitting machine of the character described, a narrow segmental pitting knife, said knife being arcuate in shape both longitudinally and in cross section, a pivotal support for the knife, said pivot being located at the center of the longitudinal arc of the knife, and a second pivotal support for the knife carried by the first named pivotal support, said second pivot being located at the center of the arc forming the cross sectional shape of the knife.

7. In a fruit pitting machine of the character described, a narrow segmental pitting knife, said knife being arcuate in shape both longitudinally and in cross section, a pivotal support for the knife, said pivot being located at the center of the longitudinal arc of the knife, a second pivotal support for the knife carried by the first named pivotal support, said second pivot being located at the center of the arc forming the cross sectional shape of the knife, and a support cooperating with the knife and adapted to receive and support the stem end of a peach, said first and second named pivotal supports being positioned at one side of a center line drawn through the longitudinal axis of the peach when placed in position on the support.

8. In a machine for pitting fruit a pair of narrow segmental knives curved longitudinally and transversely, means for advancing said knives into a piece of fruit on opposite sides of the pit thereof along arcuate paths having substantially the same curvature as their longitudinal curves, and means for oscillating said knives in the direction of their transverse curves.

9. In a fruit pitting machine of the character described, a rotatable shaft, a narrow elongated longitudinally arcuate pitting knife rigidly fixed at one end to an end of the shaft and extending longitudinally of the shaft, means mounting the shaft and knife for rotation about an axis passing substantially through the center of the longitudinal arc of the knife, and means secured to said shaft for rotating the shaft about its own axis.

10. A peach pitter comprising an elongated arcuate pitting knife having a point at one end and being affixed at its opposite end to a shaft, means mounting the shaft and knife for rotation about an axis passing substantially through the center of the longitudinal arc of the knife for thrusting the point of the knife into the flesh of the fruit to move the arcuate pitting knife around the pit of the fruit, and means secured to said shaft for rotating the shaft about its own axis to sever the flesh of the fruit from the pit.

11. In a fruit pitting machine, a support for a fruit to be pitted, a pair of arms pivotally supported with relation to the support, an arcuate pitting knife pivotally supported on each arm, means cooperating with the support whereby the stem end of the fruit and the pit contained therein is placed in a fixed predetermined position with relation to the support end of the knives, and means for inserting the arcuate pitting knives into the fruit from the stem end thereof and for oscillating the knives after insertion to free the pit with relation to the surrounding flesh.

PERCY JEPSON.